United States Patent [19]

Vandelli et al.

[11] 4,421,178
[45] Dec. 20, 1983

[54] ROTARY CULTIVATOR HOEING TOOL FITTED WITH ONE OR MORE NON-COMPACTION TEETH

[75] Inventors: Dino Vandelli, Spilamberto; Ugo Fabriani, San Cesario sul Panaro; Ambrogino Vandelli, Vignola, all of Italy

[73] Assignee: ASCO Di Vandelli Dino & C. S.N.C., Modena, Italy

[21] Appl. No.: 296,175

[22] Filed: Aug. 25, 1981

[30] Foreign Application Priority Data

Aug. 26, 1980 [IT] Italy .................. 40064 A/80
Jul. 23, 1981 [IT] Italy .................. 40079 A/81

[51] Int. Cl.³ .................. A01B 9/00; A01B 33/02; A01B 33/10
[52] U.S. Cl. .................. 172/548; 172/253; 172/713; 172/762
[58] Field of Search ........ 172/108, 109, 119, 121–124, 172/540, 548, 549, 550, 552, 553, 554, 556, 42, 43, 111, 713, 741, 752, 762, 250–253

[56] References Cited

U.S. PATENT DOCUMENTS

| | | | |
|---|---|---|---|
| 689,935 | 12/1901 | Wehrenberg | 172/553 |
| 943,989 | 12/1909 | Nacke | 172/554 |
| 971,218 | 12/1910 | Schaller | 172/121 X |
| 1,398,668 | 11/1921 | Bordsen | 172/553 X |
| 1,715,235 | 5/1929 | Hearn | 172/122 X |
| 2,159,347 | 5/1939 | Austin | 172/554 X |
| 2,706,441 | 4/1955 | Caldwell et al. | 172/78 X |
| 4,043,399 | 8/1977 | Morrison | 172/123 X |

FOREIGN PATENT DOCUMENTS

| | | | |
|---|---|---|---|
| 148987 | 4/1950 | Australia | 172/556 |
| 145848 | 9/1950 | Australia | 172/556 |
| 238143 | 7/1960 | Australia | 172/556 |
| 372765 | 5/1932 | United Kingdom | 172/119 |
| 960839 | 6/1964 | United Kingdom | 172/556 |

*Primary Examiner*—Paul E. Shapiro
*Attorney, Agent, or Firm*—Lowe, King, Price & Becker

[57] ABSTRACT

A rotary hoeing tool comprising a flat portion, or hoe-blade, furnished with a forward cutting edge and one or more teeth set apart, parallel with each other, interchangeable or otherwise and protruding downwards to the rear of the tool's cutting edge, designed to forestall compaction of the earth resulting from the action of the hoe-blade. The said flat portion or blade (4, 5 & 15) may be fixed direct to the flange (11) of the cultivator's rotor shaft (10) by way of a flat shank (2), or onto an L-shaped mounting connected to the flange (11) of the cultivator shaft (10). The teeth (6, 7, 8 or 22) may be incorporated directly into the flat portion or blade (4 or 5) part of the tool, or made fast to the L-shaped mounting independently of the actual hoe-blade.

5 Claims, 25 Drawing Figures

ROTARY CULTIVATOR HOEING TOOL FITTED WITH ONE OR MORE NON-COMPACTION TEETH

BACKGROUND OF THE INVENTION

The invention relates to a rotary hoeing tool fitted with one or more non-compaction teeth, that is, a tool attached to a flange of a cultivator's rotating shaft and provided with one or more teeth to displace earth in order to prevent compaction.

Current cultivator technology includes hoeing tools shaped as curved blades, formed from a flat rectilinear portion, or fixing shank, into a flat section with forward cutting edge. The cutting edge is perpendicular or formed at an obtuse angle through a wide radius with respect to the shank. The shank is attached flush to the cultivator shaft flange with bolts.

This current hoeing technique stands in need of further improvement since the flat tool, in performing its cutting stroke, exerts evenly-distributed downward pressure on the earth sufficient to tamp it to a shine, which renders it impervious and creates a wide dispersal of water-resistant clods, causing imperfect drainage, a resulting lack of even growth, and poor yield, in the crop being farmed.

From the foregoing outline one may recognise the need for a solution to the technical problem of creating a tool for rotary, or steerage hoeing whose shape is such as will prevent, or at least reduce considerably, compacting of large areas of earth which is a common result of hoeing. Furthermore, the tool should be able to turn over the displaced clods of earth to achieve satisfactory ploughing under of green manure, -unobtainable with traditional implements.

SUMMARY OF THE INVENTION

The invention described herein resolves the above-mentioned technical problem with a tool comprising a hoe-blade furnished with one or more teeth extending rearwardly thereof toward a base of the blade body. The teeth are perpendicular to the hoe-blade and are designed to cut into, and break up earth compressed by the blade, preventing formation of compacted and impervious strata.

By way of example, the description herein sets forth two kinds of tool to which the invention relates. The first kind of tool consists of a traditional hoe-blade which is fixed direct to the shaft flange of the cultivator, and furnished with one or more permanently located or interchangeable teeth.

The second kind of tool consists of two separate parts, both of which are interchangeable: a hoe-blade with one or more teeth, and an L-shaped mounting affixed to the cultivator shaft flange. The blade itself may be provided with rearwardly-sloping members on its top side to facilitate turning over of the displaced clods, thus achieving an effective ploughing under of the earth.

With regard to the first kind of tool, the advantages obtained from the invention are: elimination or drastic reduction of earth compaction; possibility of elongating the blade portion laterally bent away from the shank so as to increase the effective cutting width of each tool, and the consequent spacing out (hence possible reduction) of the cultivator's shaft flanges; resulting preclusion, or lessening, of the chance of entanglement—especially that occasioned by grass and roots in closely-spaced flange arrangements.

The second kind of tool to which the invention relates provides the following advantages, in addition to those listed above: a notably more effective turnover action executed by the hoe-blade on the displaced clod of earth, with the result that a markedly greater surface area of earth is rendered utilisable for better ploughing-under; a deeper, and sweeter cut of the blade into the earth; possibility of simulating the effects of digging by spade; better resistance to stress on the part of both blade and rear teeth; greater depth of hoeing; the possibility of utilising a lesser number of hoe-blades per flange on the cultivator, thus producing a simpler shaft; a reduction in necessary mechanical power, hence—in relation to the work carried out—reduced stress on the entire machine's working parts in comparison with rotary cultivators armed with traditional hoe blades; improved cutting up of the earth; increased working speed; better preparation of the seed bed; speedy changeover of tools from/to mountings; interchangeability of single parts when required for independent utilisation.

BRIEF DESCRIPTION OF THE DRAWINGS

A variety of embodiments are possible for the invention, some of which are illustrated here, strictly by way of example, with the aid of the accompanying drawings, in which:

FIGS. 1, 2 & 3 show the kind of tool bent through to an obtuse angle,—in profile, from above, and from the left, respectively; this blade being of a kind fitted with a single rightangled-triangular tooth on its lower side, the same bedded in and welded, orientated in line with the cultivator's direction of movement, with a forwardly-disposed hypotenuse;

FIGS. 4, 5 & 6 show the same views as in FIGS. 1, 2 & 3, of the kind of tool bent through to a rightangle and fitted with two rightangled-triangular teeth with rearwardly-disposed hypotenuse;

FIGS. 7, 8 & 9 show the same views as in FIGS. 1, 2 & 3 of the kind of tool bent through to a rightangle and fitted with three teeth in the form of studs, bedded in and welded;

FIGS. 10, 11 & 12 show the same views as in FIGS. 1, 2 & 3 of the kind of tool bent through to a rightangle and fitted with a single stud-type tooth, bedded in and secured by means of a locking nut;

FIGS. 13–24 show a second form of embodiment of the tool to which the invention relates consisting of two interchangeable parts attached to an L-shaped mounting fixed to the cultivator's shaft flange;

FIG. 17' shows the frontal view of a guillotine-type blade with upper flaps, particularly suited to gradual penetration of the earth and turning-over of same;

DESCRIPTION OF THE PREFERRED EMBODIMENTS

With reference to FIGS. 1–12: (in FIG. 4) 1 denotes the fixing portion of the rightangle bend tool; 3 denotes the cutting edge relative to those tools with fixing portion, or shank 1 & 2; 4 & 5 denote the lateral, compressive portions of blades with shank 1 and shank 2 respectively; (in FIGS. 1, 2 & 3) 6 denotes a triangular tooth with forwardly disposed hypotenuse, bedded in and welded to the blade portion 5 prolonging from shank 2 rearwardly of cutting edge 3; (in FIGS. 4, 5 & 6) 7 denotes triangular teeth with rearwardly disposed hypotenuse, fixed in like manner to the former 6; (in FIGS. 7, 8 & 9) 8 denotes cylindrically shaped teeth bedded in and welded to the blade portion 4—as in portion 5—rearward likewise of the cutting edge; (in FIGS. 10, 11 & 12) 9 denotes an interchangeable cylindrical tooth bedded in, positioned and locked tight by means of a thread and nut coupling, rearward of cutting edge 3.

With reference to FIGS. 13–24: 10 denotes the cultivator's horizontal shaft, or rotor bearing one or more flanges 11 onto whose surfaces two or more L-shaped mountings are attached by means of bolts 12, the said mountings showing a straight arm section 13 whose axis 14 is disposed out of radial alignment with respect to the shaft axis C by a value equal to letter E, this determining the angle of attack between hoe-blade 15 and ground 16; values E & B are dependent upon the length of the hoe-blade, upon the characteristics of the ground, and upon the height of the shaft 10 with respect thereto; 17 denotes strips fixed to the flange 11 by means of bolts 18 and connected to the rear face of arms 13 in order to provide a reinforcing strut; 19 denotes the transverse end arm portion of each L-shaped mounting bent through square with respect to arm 13 thus constituting the support member for shank 20 of hoe-blade 15; 21 denotes the slot incorporated into the shank 20 (see FIGS. 14 & 21) for mounting thereof onto transverse arm 19; 22 denotes the working part of rear members, or teeth provided with fixing shanks 23 likewise incorporating slots 24 for mounting thereof onto the transverse end portion 19 of each straight arm 13; each member's actual working part 22,—whose cross-section describes a rhomboid—, is displaced longitudinally with respect both to the said fixing shank and the said slot 24, with the end in view of permitting a transverse offset of each pair of said rear members' actual working parts in order to preclude the possibility of entanglement; 25 denotes upper lateral support protrusions from each fixing shank 23, broken by notches 26 designed to provide protection for pins 27, these inserted through pairs of holes 28 located in each transverse end 19 of arms 13 for holding together,—by means of said pins 27—, the assembly consisting of the two fixing shanks 23 plus the shank 20 of hoe-blade 15 interposed therebetween and fixed to the said transverse end 19 by means of screws 29; (in FIG. 15) 30 denotes an upper cap for enclosure of slot 21, furnished with an aperture 31 through which to pass the appropriate screw 29; (in FIG. 16) a pair of flaps located on the upper edge of hoe-blade 15 is denoted by 32, the same inclined rearward in order to assist ploughing under; (in FIG. 14) 33 denotes the threaded seat located in transverse end 19 destined to receive screw 29; 34 denotes a pair of recesses in the hoe-blade's upper region 15 located between the shank 20 and flaps 32.

The tool to which the invention relates, in the embodiment shown in FIGS. 1–12, functions as follows: the teeth, whatever the shape and however located, whether by bedding in and bolting through, or welding to either of the traditional hoe-blade bodies 4 or 5, whether permanently fixed or interchangeable, penetrate into the earth immediately following the entry thereinto of the cutting edge 3, digging, displacing or breaking up the soil and thus destroying the initial compacting effect of the cutting edge and the portion of blade 4 or 5 immediately following, also forestalling the possibility of compacting being carried further by the central and rear portions of the blade body, or at any rate avoiding that compacting be extended to large enough surface areas of earth to cause noticeable lack of effective drainage. One should observe that the teeth perform an active role in displacing the earth, thus enabling the cultivator's hoeing depth to be set slightly more shallow, with a resultant saving in energy.

Figure 18:
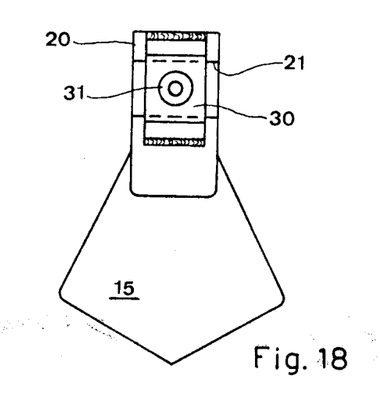
FIG. 18 shows the frontal view of a hoe-blade whose shape derives from that of FIG. 17, and prolongs into a lower triangular portion giving it added penetration into deeper soil.
Figure 19:
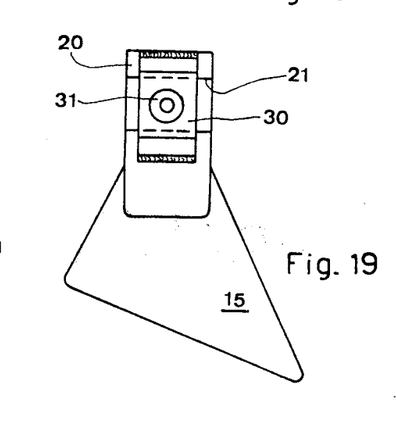
FIG. 19 shows a variation on the shape of the blade in FIG. 18, designed for more gradual soil penetration.
Figure 20:
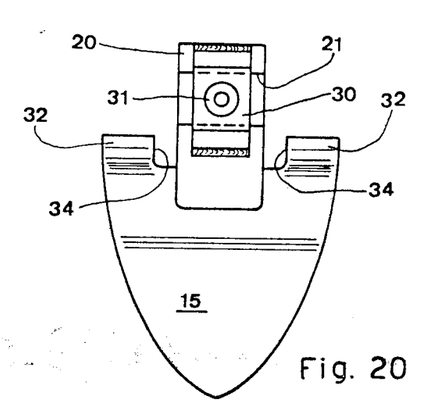
FIG. 20 is the frontal view of a shield-shaped blade for penetrating compacted earth; the blade body inclines inwards in the event that angle B (FIG. 13)—between ground and implement—should be of an elevation too great to permit optimum penetration into the earth.
Figure 21:
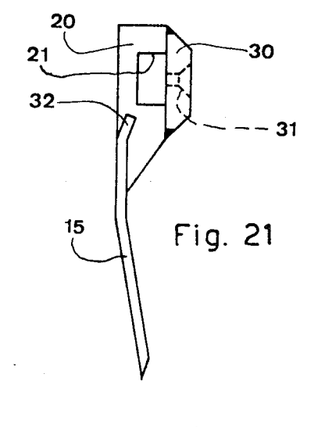
FIG. 21 is a view from the left of the blade in FIG. 20.
Figure 22:
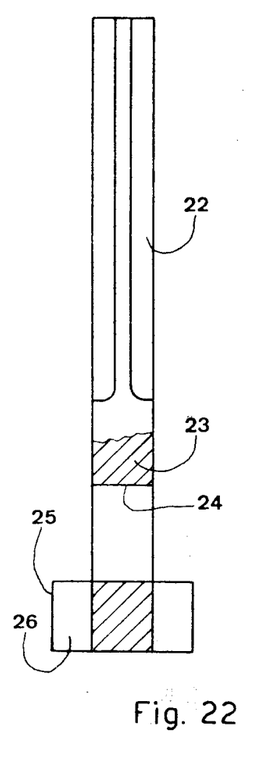
FIG. 22 shows the frontal, part cut-away view of the working surface of one of the entrenching tools—or teeth—fastened to the blade rear and forming an angle of 90° therewith.
Figure 23:
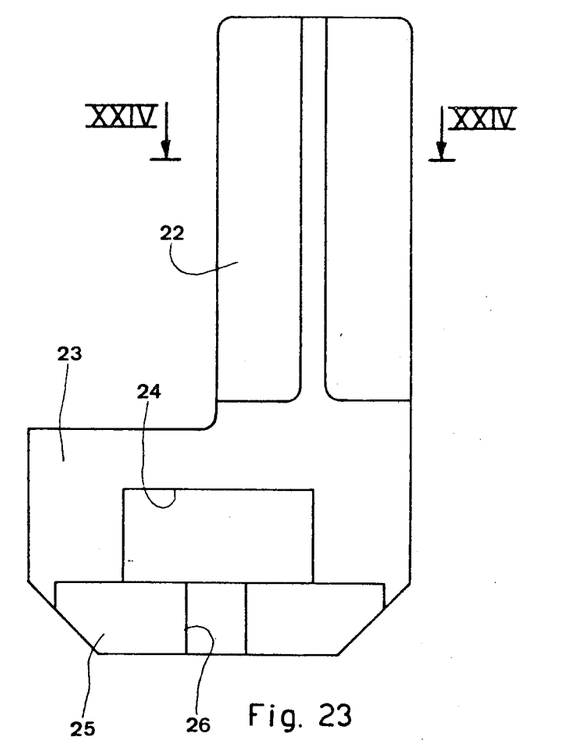
FIG. 23 is a view from the left of the tool in FIG. 22.
Figure 24:
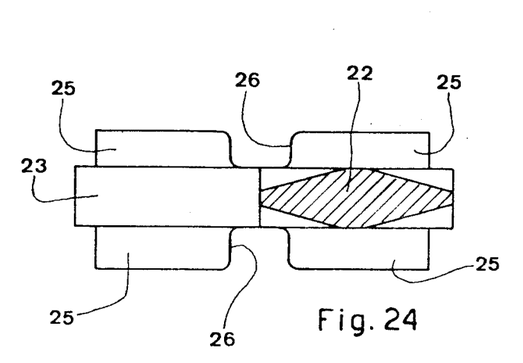
FIG. 24 shows the cross-section of FIG. 23 according to XXIV—XXIV placing in evidence that part of the tool designed to penetrate in two distinct directions.

With regard to the second form of embodiment illustrated in FIGS. 13–24, mounting thereof to the relative arm 13/19,—in the case of the variations in FIGS. 17, 18 and 19—, is achieved as follows (see FIG. 14): slot 24 of a first rear member's 22 fixing shank 23 is slid onto the square-bent end portion 19 of one of the L-shaped arms 13,—that is, up to the point where notch 26 engages with that resilient pin 27 located in the hole 28 nearest straight arm portion 13; slot 21 of the hoe-blade 15 shank 20 is then slid onto the same square-bent end 19 and made fast by means of screw 29; this is followed by the similar coupling of slot 24 of a second rear member's 22 fixing shank 23, the second member offset longitudinally with respect to the first; lastly, the remaining resilient pin 27 is located in its respective hole 28 so as to engage the protective notch 26 in shank 23.

Figure 1:
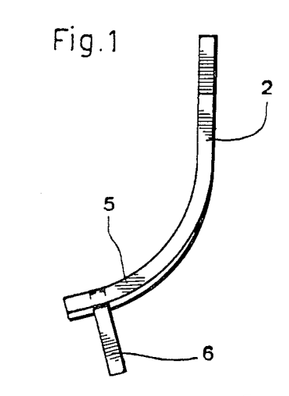
FIGS. 1–12 show a first form of embodiment of the tool to which the invention relates, consisting of a traditional hoeing blade fixed directly to the cultivator's shaft and furnished with one or more permanently fixed or interchangeable teeth.
Figure 2:
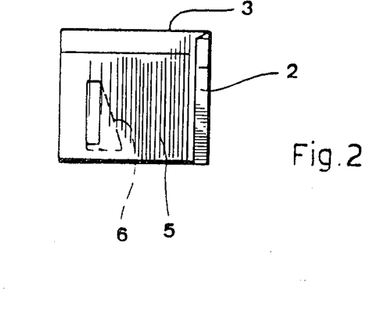
Figure 3:
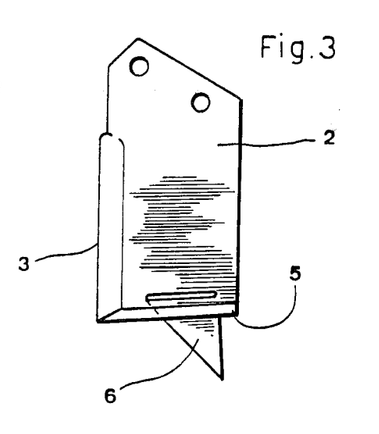
Figure 4:
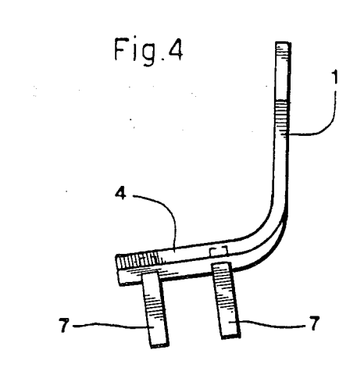
Figure 5:
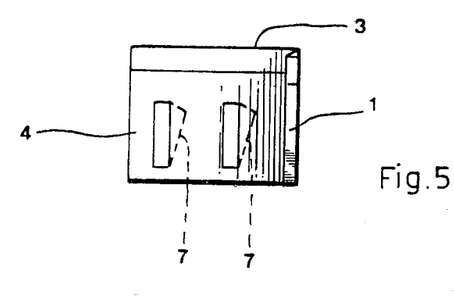
Figure 6:
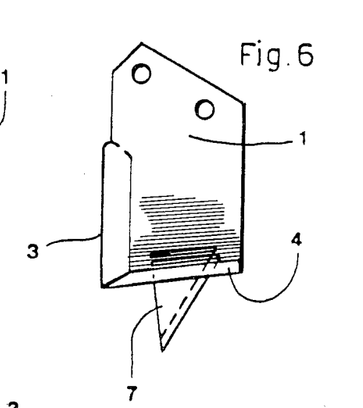
Figure 7:
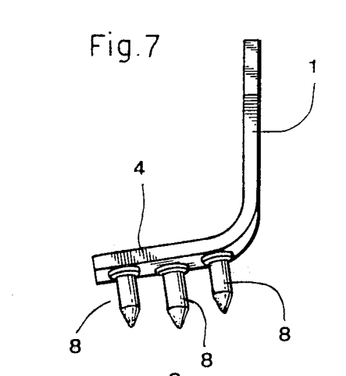
Figure 8:
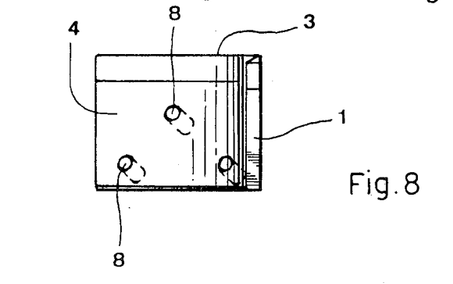
Figure 9:
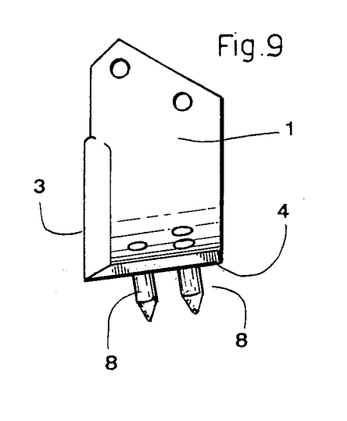
Figure 10:
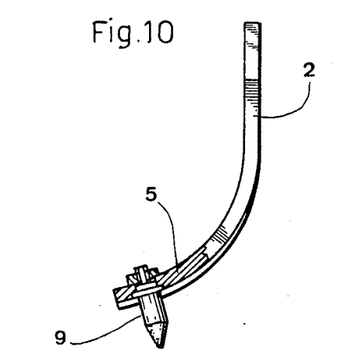
Figure 11:
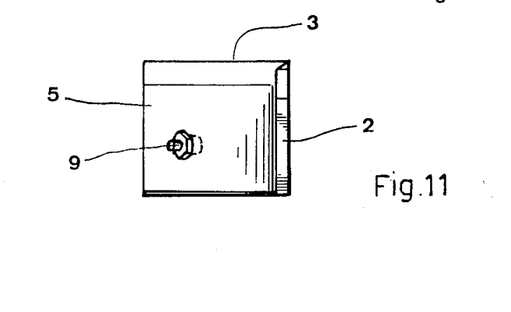
Figure 12:
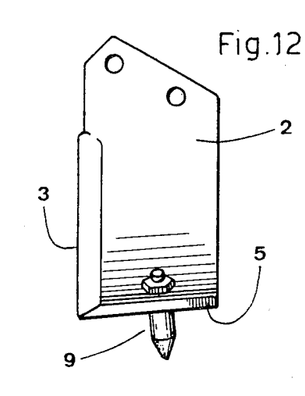
Figure 13:
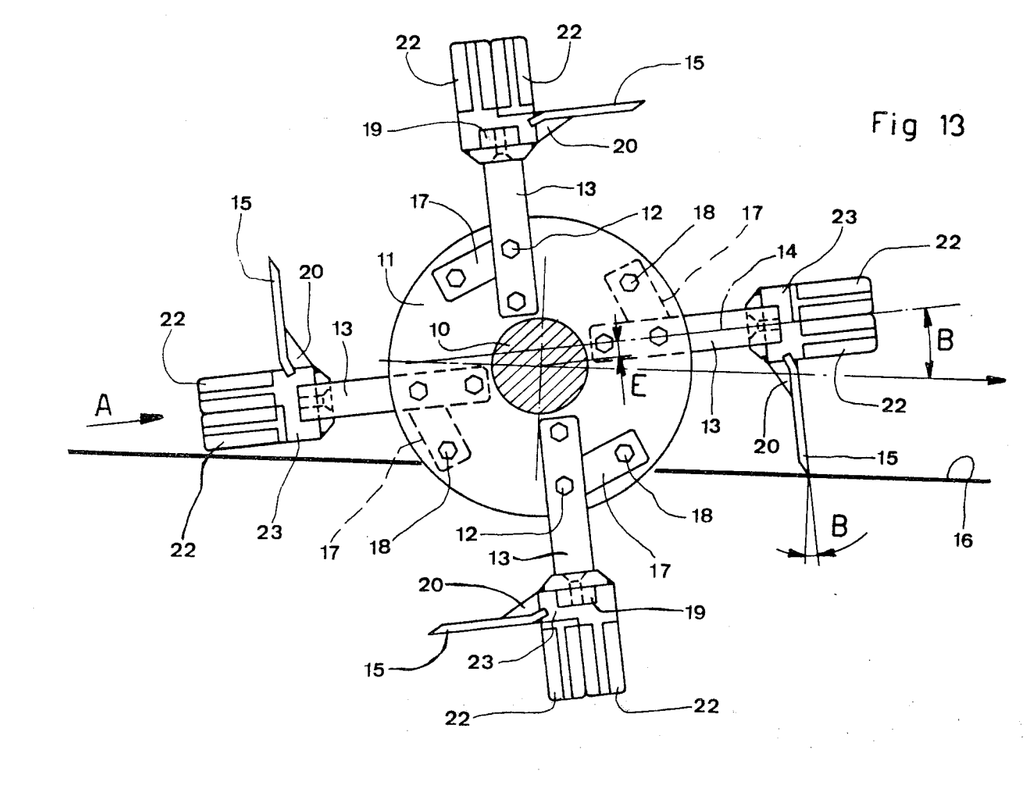
FIG. 13 is a partially cut-away lateral view of a group of four tools of the kind to which the invention relates, comprising a left-hand pair and a right-hand pair, attached to one of the flanges on the cultivator shaft.
Figure 14:
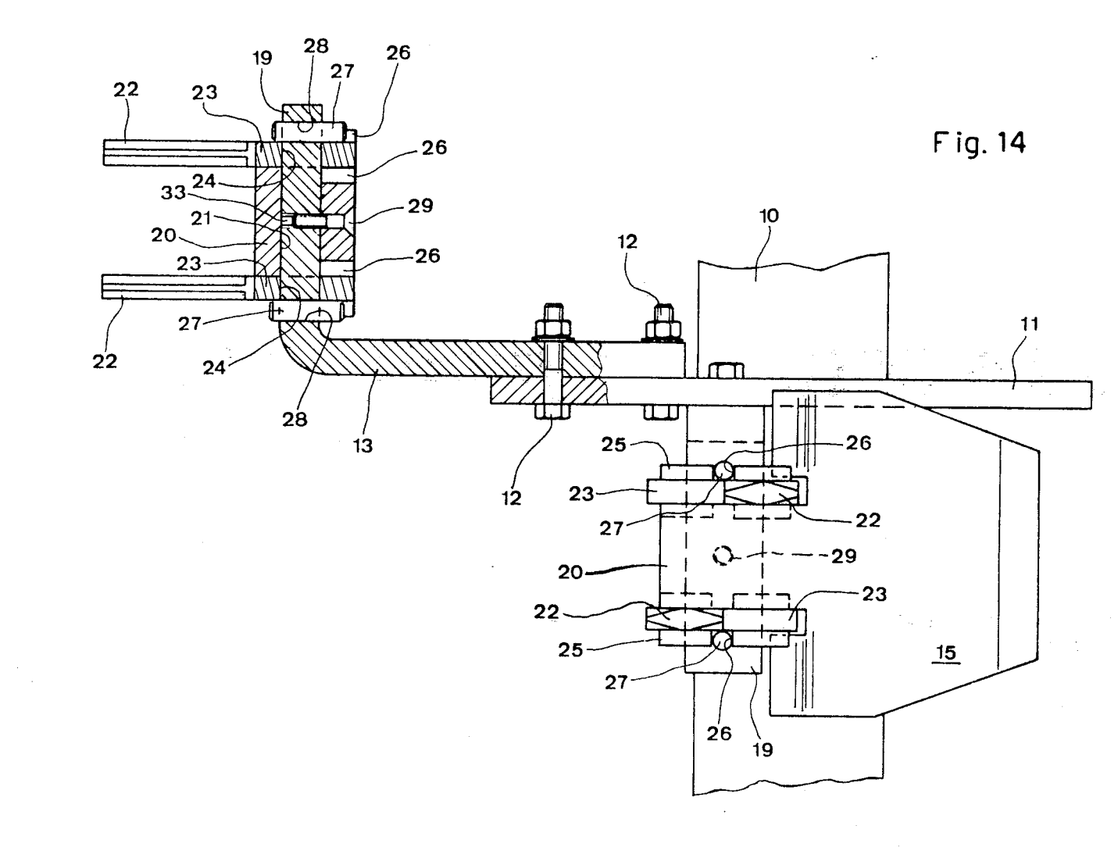
FIG. 14 is a view of FIG. 13 according to letter A partly cut-away and on a larger scale.
Figure 15:
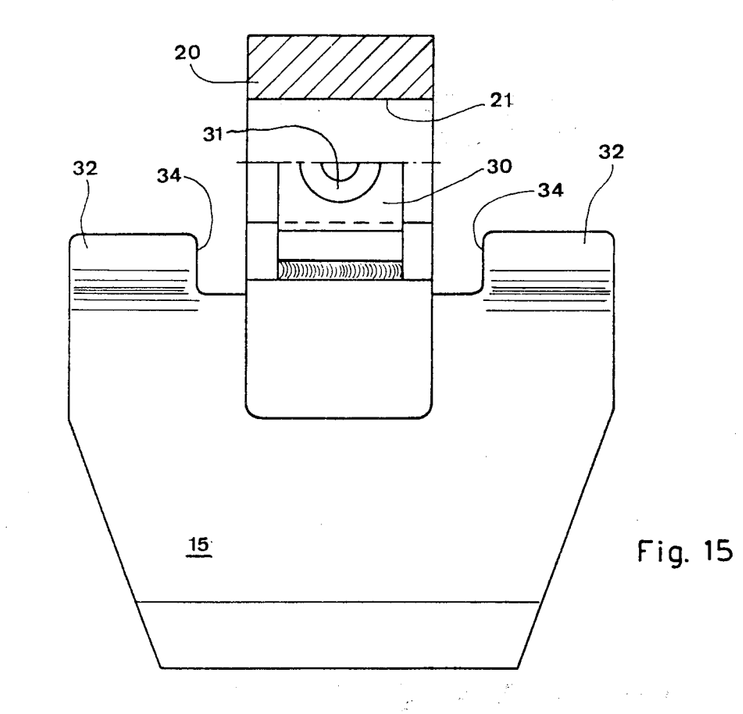
FIG. 15 shows the frontal view of a trapezoidal hoe-blade of the kind to which the invention relates, part cut-away, and showing flaps at the blade's greater base designed to assist turning over of the earth.
Figure 16:
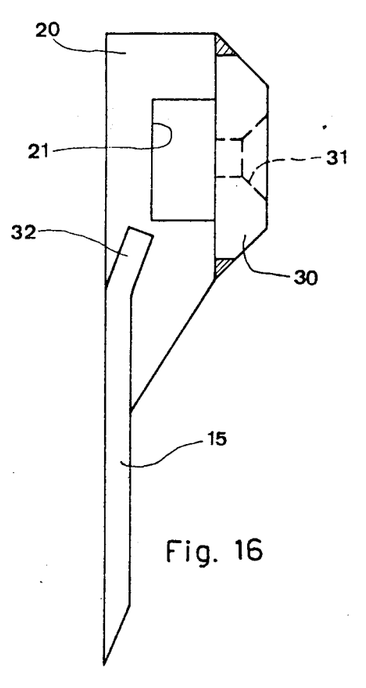
FIG. 16 is a view from the left of the blade in FIG. 15.
Figure 17:
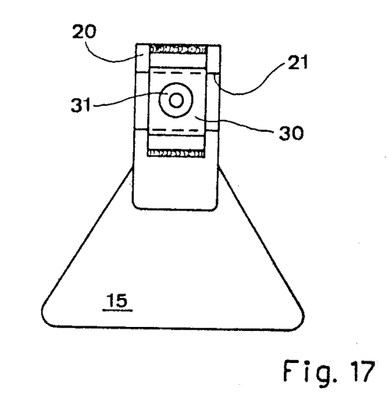
FIG. 17 shows the frontal view—as per FIG. 15—of a trapezoidal blade of the kind suited to looser earth, it being 'upturned' with respect to that in FIG. 15, hence without flaps.

In the case of those variations in FIGS. 15, 17' & 20, the assembly is mounted en bloc following insertion of fixing shanks 23 of the rear members 22 into the recesses 34 at the hoe-blade's 15 upper extremity, by sliding of the group of relative slots onto that square-bent end arm 19 conjoining with arm 13 of the L-shaped mounting. Its function is to all intents and purposes the same as of that embodiment illustrated in FIGS. 1–12; once the cultivator shaft 10 is put into rotation, it is lowered and the tractor moves forward in such a way that hoe-blade 15 penetrates into the ground followed by its rear members, or teeth 22, which cut into the earth, breaking up those smooth surfaces left by the passage of the cutting edge and said blade body, thus preparing loosened soil in the path of the successive tool which therefore encounters a considerably lesser resistance; hoe-blade 15 in particular,—especially if furnished with flaps 32—, produces a notable plough-under effect. It will be clear that by introducing a spacing element between one or more of the L-shaped mountings' straight arms 13 and the flange 11, one may achieve an offset of one pair of hoeing tool's rear teeth with respect to the pair following in rotation: for example, if each tooth pair is set at a transverse distance of 8 cm, one may achieve longitudinal cuts at every 4 cm, hence optimum break-up of the earth.

When carrying the invention into effect, the materials, dimensions, and design details may differ from those described herein while retaining an equivalent technical character, hence by no means straying from within the framework of protection afforded to the concept behind the invention: for instance, teeth 6, 7 & 8 could be truncated-conical in shape, or truncated-pyramidal, or even of a conformation with ovaloid cross-section and main axis disposed along the direction of forward rotation. Again, the angle of attack between blade 15 and ground, the blade's shape and length (up to 18 cm plus), that of the rear members, or teeth 22 (up to 20 cm plus) may all differ from those described above.

One may observe that the said rear member's, or rear tooth's 22 shank is square with the tooth itself and that, in the case of two of the same being utilised, an arrangement in which one of the tooth shanks faces forward, and the other tooth shank faces rearward, would achieve that transverse offset therebetween necessary to the avoidance of entanglement: hence the member, or tooth's 22 double-edge. Moreover the assembly comprising blade 15 and teeth 22 could be a single unit, although this would preclude the single parts' being interchangeable. It should be noticed that blade 15 shows a length to width ratio,—that is, between the longitudinal and transverse axes, respectively—, totally different from the variations of that embodiment illustrated in FIGS. 1–12; in fact the latters' length is invariably noticeably less than their width (for example a maximum 12 cm as against 16 cm); this signifies that for the purposes of achieving a certain minimum of hourly production, one is obliged to fit more than four blades to the single flange, and to bunch the flanges together more tightly on the rotor shaft. Finally, one may observe that a much greater depth is achieved with rear members, or teeth 22 than with teeth 6, 7 & 8.

What is claimed is:

1. A rotary cultivator hoeing tool affixed to a flange of a cultivator shaft, comprising:
    (a) an L-shaped mounting member having a first arm affixed to the cultivator shaft flange to extend in a generally radial direction of the flange and a second arm attached to the first arm to extend transversely therefrom; and
    (b) a hoe blade having at an upper central section thereof a shank attachable to the transverse second arm of said L-shaped mounting member, wherein said shank includes a transverse slot engageable with said transverse second arm, and means for securing the shank to the second arm, said means including a cap positioned to retain the second arm within the slot and a screw insertable to pass through an aperture formed in the cap to threadedly engage a central threaded seat formed in the transverse second arm to thereby connect the shank to said second arm.

2. A rotary hoeing tool according to claim 1, wherein said hoe blade is dimensioned to have a length to width ratio of approximately 1:1, said length being longitudinally measured from its connecting axis with said second arm.

3. A rotary hoeing tool according to claim 1, wherein said hoe blade includes a pair of rearwardly inclined upper flaps engageable with the ground to thereby plow under soil loosened by the blade.

4. A rotary hoeing tool according to claim 3, wherein said hoe blade includes at least one tooth having an upper fixing shank extending substantially perpendicular to the tooth, said upper shank having a transverse slot for receiving said transverse second arm, an upper part of said fixing shank including two pairs of lateral support protrusions located on opposite sides of the fixing shank, respectively, each pair of support protrusions on each side of the shank being separated by a notch; and a resilient pin engageable with said transverse second arm through one of said notches to thereby secure the fixing shank and tooth to said second arm.

5. A rotary hoeing tool according to claim 4, further including a pair of teeth, and wherein said hoe blade includes a pair of recesses located respectively between the blade shank and each of said rearwardly inclined flaps, each recess receiving the fixing shank of one of said teeth, enabling the blade shank and the fixing shank to be coupled together on the transverse second arm and retained transversely thereon by means of said resilient pin, said pin being inserted within a corresponding hole formed in said transverse second arm.

* * * * *